Nov. 23, 1948.  S. F. POTTS ET AL  2,454,339
SPRAYER
Filed Oct. 31, 1947  2 Sheets-Sheet 1
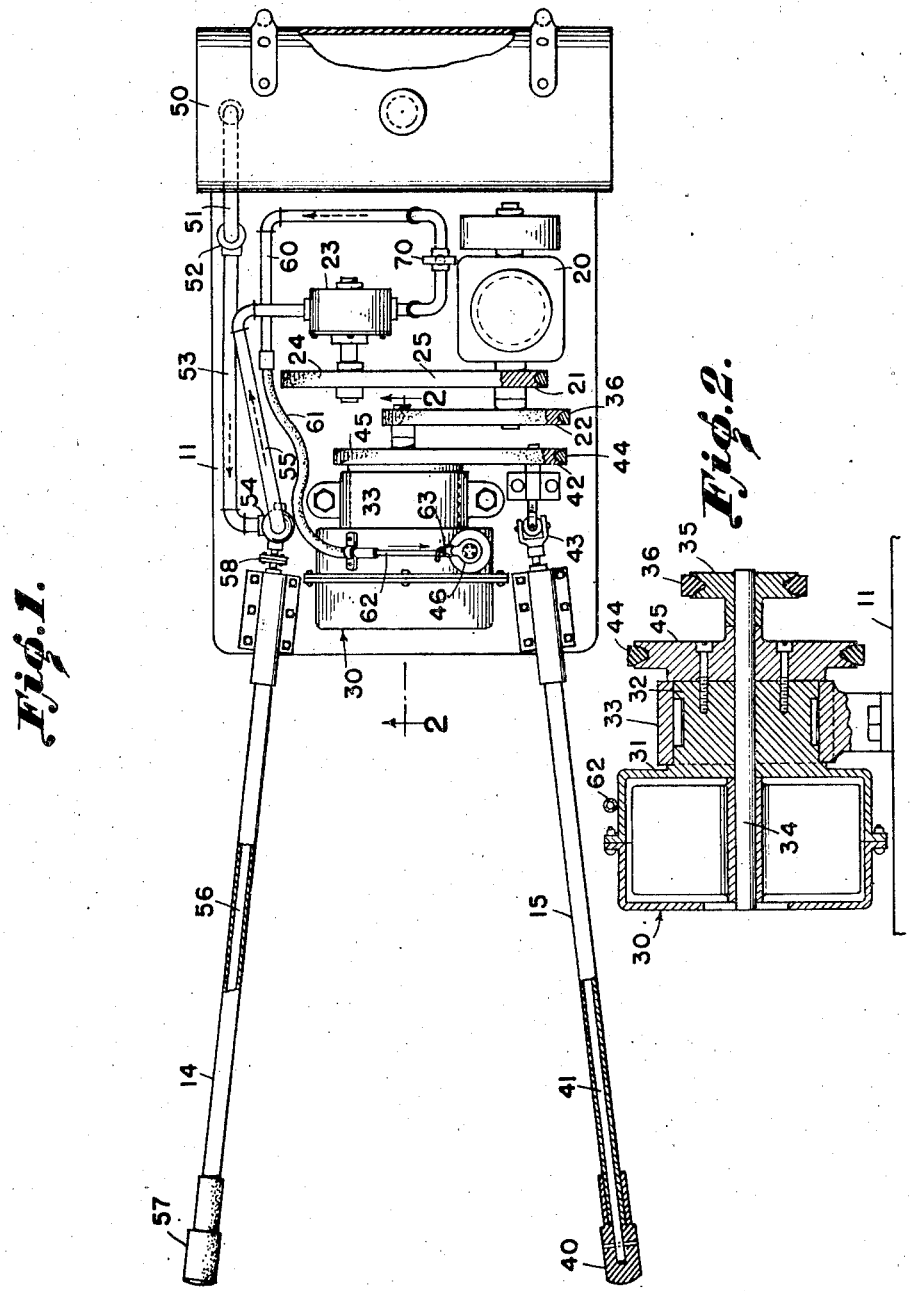
INVENTORS
S. F. POTTS
R. A. SPENCER
BY
ATTORNEYS Nov. 23, 1948.    S. F. POTTS ET AL    2,454,339
SPRAYER
Filed Oct. 31, 1947    2 Sheets-Sheet 2
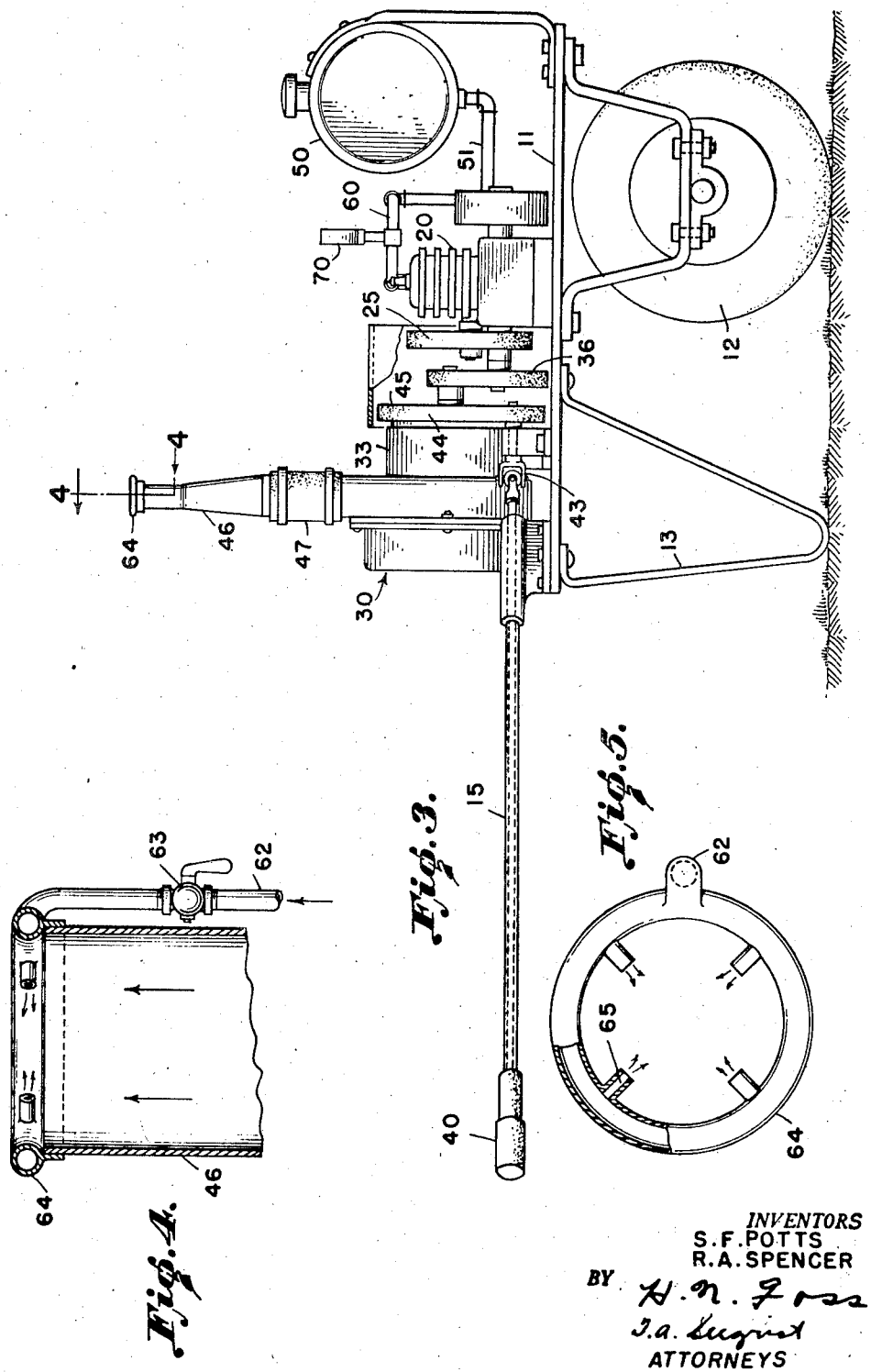
INVENTORS
S. F. POTTS
R. A. SPENCER
BY
ATTORNEYS Patented Nov. 23, 1948

2,454,339

UNITED STATES PATENT OFFICE 2,454,339

SPRAYER

Samuel F. Potts, Hamden, and Roderick A. Spencer, Stafford Springs, Conn.; dedicated to the free use of the People in the territory of the United States Application October 31, 1947, Serial No. 783,424

5 Claims. (Cl. 261—30)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

We hereby dedicate the invention herein described to the free use of the people in the territory of the United States to take effect on the granting of a patent to us.

This invention relates to sprayers of the type wherein a large volume of air at high velocity and low pressure is ejected through a nozzle and a small amount of liquid material, such as a highly concentrated solution of an insecticide, is fed into the air stream for deposit in trees or the like, thus to cause fine subdivision of the material in the air, wide and uniform coverage and without use of an amount of the insecticide material in excess of that required to give a good insect control.

Known devices of this kind are generally provided with a blower for producing a high velocity and volume of air, a nozzle through which the air is ejected mounted on the blower, a pump for pumping a controlled amount of a liquid material into the air stream, and a power means, such as an internal combustion engine, for operating the blower and pump, the blower and nozzle being mounted to pivot in a substantially vertical plane so that the nozzle and outflowing air stream may be directed toward any part of a tree while spraying it. This type of sprayer is portable, and generally requires at least two operators, one for transporting the sprayer and the other to operate it.

It is the object of the present invention to provide a small sprayer of the type above described which is simple in structure, manually portable, and which can be handled easily by one operator, both transporting it and operating it.

In general, according to the invention, the blower, pump and power means are mounted on a hand truck having projecting handles for guiding and propelling the same, such as the ordinary wheelbarrow type, a handle of the truck being provided with a control mechanism for pivoting the blower, and preferably also a handle provided with a control mechanism for regulating the amount of liquid material being fed into the air stream.

For a detail description of the invention, reference is made to the accompanying drawing, in which Figure 1 is a top plan view of the sprayer with parts broken away for purposes of illustration;

Figure 2 is an enlarged section on the line 2—2 of Figure 1;

Figure 3 is a side elevation of the sprayer;

Figure 4 is an enlarged section of a portion of the nozzle on the line 4—4 of Figure 3; and Figure 5 is an end view of the nozzle with parts broken away for purposes of illustration.

The truck illustrated, generally similar to a wheelbarrow, is provided with a platform 11, carried by a front wheel 12 and supported at the rear with legs, one of which is shown at 13, a left-hand handle 14 and a right-hand handle 15 being fixed to the platform in the manner shown.

The schematically shown engine 20 may be of any desired type and is provided with drive pulleys 21 and 22. Pump 23, also shown schematically, may be of any desired type, and is provided with a pulley 24, drive belt 25 being belted on pulleys 21 and 24.

Blower 30 is in general of a usual construction. The casing 31 of the blower is, however, provided with a cylindrical hub 32 pivotally mounted in a bearing 33 which in turn is fixedly mounted on the platform. The fan blades of the blower are driven through shaft 34, pulley 35 fixed to the end of the shaft, pulley 22 of the engine and belt 36 belted on pulleys 35 and 22.

In order that the operator may pivot the blower while transporting the sprayer, handle 15 is tubular, and is provided with a rotatable hand grip 40 mounted thereon to which is fixed one end of a rod 41 rotatably mounted inside the handle, the rod operating a motion-transmitting mechanism for pivoting the blower. This mechanism comprises a pulley 42 driven by the rod through a universal joint 43, and a belt 44 belted on pulley 42 and on a pulley 45 fixed to the hub 32 of the blower.

Air from the blower is ejected through a nozzle 46 fixedly coupled to the blower with a short piece of tube 47. Rotation of hand grip 40 causes the blower to pivot so that the nozzle may be rotated to direct the air stream from the base of trees or bushes on the right upward and over to the base of trees or bushes on the left.

The liquid material is contained in a tank 50 and flows from the tank through pipe 51, filter 52, pipe 53, flow-regulating valve 54 provided with the usual valve stem and pipe 55 to the pump 23, the handles of the truck being also provided with a control mechanism for operating the valve.

For this purpose, handle 14 is hollow and is provided internally with a rotatably mounted rod 56, hand grip 57 being fixed to the end of this rod. The other end of the rod is attached through a joint 58 to the stem of valve 54, so that the operator can, by twisting grip 57, regulate the flow of liquid to the pump.

The liquid flows from the pump through pipe 60 and flexible hose 61, pipe 62, which may contain a shut-off valve 63, into a circular tube 64 fixed on the end of the nozzle, and then is ejected radially into the air stream through a plurality of small ports, as shown at 65. A pressure gage 70 in view of the operator communicates with pipe 60, so that the operator may be advised as to the liquid feed rate and regulate the valve 54, to give a desired density of liquid droplets in the air stream.

Having thus described the invention, what is claimed is:

1. A sprayer provided with a blower for producing a high velocity and volume of air, a nozzle through which the air is ejected mounted on the blower, a pump for pumping liquid material into the air stream and a power means for operating the blower and pump, characterized in that the blower, pump and power means are mounted on a truck having projecting handles for guiding and propelling the same, the blower being mounted to pivot in a substantially vertical plane and a handle of the truck being provided with a control mechanism for pivoting the blower.

2. The sprayer as defined in claim 1, characterized in that the control mechanism for pivoting the blower comprises a hand grip mounted on the handle, a rotatably mounted rod attached to the hand grip, and motion transmitting mechanism operated by the rod for pivoting the blower.

3. The sprayer as defined in claim 2, characterized in that the handle is tubular and the rod is mounted inside the handle.

4. The sprayer as defined in claim 1, characterized in that the amount of liquid material pumped into the air stream is controlled by a flow-regulating valve, a handle of the truck being also provided with control mechanism for operating the valve.

5. The sprayer as defined in claim 4, characterized in that the control mechanism for operating the valve comprises a hand grip and a rotatably mounted rod attached to the hand grip and to the stem of the valve.

SAMUEL F. POTTS.
RODERICK A. SPENCER.

REFERENCES CITED

The following references are of record in the file of this patent:

UNITED STATES PATENTS

| Number | Name | Date |
|---|---|---|
| 1,059,024 | Beyer | Apr. 15, 1913 |
| 1,476,889 | Hobbs et al. | Dec. 11, 1923 |

FOREIGN PATENTS

| Number | Country | Date |
|---|---|---|
| 536,770 | Germany | Oct. 29, 1931 |
| 350,936 | Great Britain | June 15, 1931 |